United States Patent
Akamine

(10) Patent No.: US 9,457,710 B2
(45) Date of Patent: Oct. 4, 2016

(54) OPERATION-SOUND GENERATOR

(75) Inventor: Hatsushi Akamine, Shimada (JP)

(73) Assignee: Yazaki Corporation, Tokyo (JP)

( * ) Notice: Subject to any disclaimer, the term of this patent is extended or adjusted under 35 U.S.C. 154(b) by 164 days.

(21) Appl. No.: 14/236,447

(22) PCT Filed: Jul. 31, 2012

(86) PCT No.: PCT/JP2012/004851
§ 371 (c)(1),
(2), (4) Date: Jan. 31, 2014

(87) PCT Pub. No.: WO2013/018353
PCT Pub. Date: Feb. 7, 2013

(65) Prior Publication Data
US 2014/0191860 A1    Jul. 10, 2014

(30) Foreign Application Priority Data

Aug. 1, 2011  (JP) .................................. 2011-168350

(51) Int. Cl.
| | |
|---|---|
| *B60Q 1/00* | (2006.01) |
| *B60Q 1/26* | (2006.01) |
| *B60Q 5/00* | (2006.01) |
| *B60Q 1/34* | (2006.01) |
| *B06B 1/02* | (2006.01) |
| *B60Q 1/38* | (2006.01) |
| *B60Q 9/00* | (2006.01) |

(52) U.S. Cl.
CPC ............... *B60Q 1/34* (2013.01); *B06B 1/0215* (2013.01); *B60Q 1/38* (2013.01); *B60Q 9/00* (2013.01)

(58) Field of Classification Search
CPC ... B60L 2250/16; B60R 16/03; H05B 39/02; Y02T 90/16; Y10S 315/04

USPC ..................................... 340/425.5, 474, 468
See application file for complete search history.

(56) References Cited

U.S. PATENT DOCUMENTS

| | | | | |
|---|---|---|---|---|
| 3,618,079 | A * | 11/1971 | Denning et al. ............ | 340/384.7 |
| 5,218,340 | A * | 6/1993 | Shannon et al. .............. | 340/475 |
| 5,646,590 | A * | 7/1997 | Dembicks ................ | B60Q 1/34 340/326 |
| 5,821,700 | A * | 10/1998 | Malvaso ................ | H05B 39/02 307/10.8 |

(Continued)

FOREIGN PATENT DOCUMENTS

JP    11-334469 A    12/1999

OTHER PUBLICATIONS

International Search Report and Written Opinion dated Dec. 14, 2012, issued for PCT/JP2012/004851.

*Primary Examiner* — Emily C Terrell
(74) *Attorney, Agent, or Firm* — Locke Lord LLP

(57) ABSTRACT

An operation-sound generator which can output an operation-sound similar to a hit-sound of a mechanical relay with sound pressure in which a driver is recognizable is provided. A microcomputer supplies a plurality of first pulse sequences to the buzzer at intervals during a lighting period of turning on the direction indicator lamp or the hazard lamp, each of the first pulse sequences having a pulse number differing from each other, a same pulse width, and a same duty, in an order gradually reducing the pulse number. The pulse number of each of the first pulse sequences is set so that the output of each of the first pulse sequences is finished before stationary vibration of the buzzer is performed. Furthermore, after the output of the first pulse sequence is finished, the microcomputer starts the output of next the first pulse sequence before the vibration of the buzzer is stopped.

4 Claims, 5 Drawing Sheets

(56) References Cited

U.S. PATENT DOCUMENTS

| | | | | |
|---|---|---|---|---|
| 6,476,711 B2* | 11/2002 | Kitamura | ............... | G10K 15/02 340/384.1 |
| 6,933,838 B2* | 8/2005 | Yamaki | ............... | B60Q 11/007 340/384.1 |
| 8,693,708 B2* | 4/2014 | Cronmiller | ............ | H04R 27/00 381/111 |
| 2006/0091817 A1* | 5/2006 | Herrig et al. | ............. | 315/200 A |
| 2011/0133951 A1* | 6/2011 | Palmieri | ................ | G08G 1/161 340/901 |

* cited by examiner

OPERATION-SOUND GENERATOR

TECHNICAL FIELD

The present invention relates to an operation-sound generator, specifically, an operation-sound generator having a buzzer outputting an operation-sound synchronized with a direction indicator lamp or a hazard lamp.

BACKGROUND ART

Conventionally, a vehicle has a mechanical relay for blinking a direction indicator lamp and a hazard lamp. According to operation of the direction indicator lamp or the hazard lamp, the direction indicator lamp or the hazard lamp is blinked. Furthermore, in order to confirm a blinking state of the direction indicator lamp or the hazard lamp in the vehicle by a driver, its state is indicated with an indicator. For this reason, visual information is provided, and also auditory information is provided by hit sound of the mechanical relay.

In recent years, a flashing operation of the direction indicator lamp and the hazard lamp is performed by using a semiconductor switch. In such case, the mechanical relay is not provided, and as a result the hit sound for confirming auditory information is not obtained.

In order to solve the above problem, conventionally, the buzzer intermittently sounds as the hit sound of the mechanical relay. In the hit sound of the mechanical relay, generally as shown in FIG. 7, spectrum is spread in wide frequency band. However, as shown in FIG. 8, in a general sounding state of the buzzer, only fundamental wave and high-frequency wave are indicated in the spectrum, and the spectrum is not spread in wide frequency band as the hit-sound of the mechanical relay. For this reason, the buzzer differs considerably from the hit sound of the mechanical relay, and thereby causes a feeling of strangeness.

Furthermore, as shown in FIG. 9, a device for generating display sound of a direction indicator disclosed in the Patent Document 1 intermittently outputs an operation signal, which does not arrived at current-carrying time or current-carrying capacity required to sound a sounding body with steady-state operation-sound, to the sounding body (piezoelectric vibrator) of a horn in synchronization with a direction indicator blinking signal. As a result, a sound distinctly-different from the sound of the horn and similar to the familiar the hit-sound of the mechanical relay is generated.

However, in the device for generating the display sound of the direction indicator disclosed in the Patent Document 1, an electric current is applied in a short time failing to reach the current-carrying time required to sound the horn with the steady-state operation-sound. For this reason, in a place where various operation sound or environmental sound is generated, for example, in the vehicle, a driver can not recognize the sound of the horn as the hit-sound of the mechanical relay.

CITATION LIST

Patent Literature

[PTL 1]
Japanese published application No. H11-334469

SUMMARY OF INVENTION

Technical Problem

Accordingly, an object, of the present invention is to provide an operation-sound generator which can output an operation-sound similar to a hit-sound of a mechanical relay with sound pressure in which a driver is recognizable.

Solution to Problem

In order to attain the above object, the present invention provides an operation-sound generator having a buzzer outputting an operation-sound synchronized with a blinking of a direction indicator lamp or a hazard lamp comprising: a pulse supply device supplying a plurality of first pulse sequences to the buzzer at intervals during a lighting period of turning on the direction indicator lamp or the hazard lamp or a non-lighting period of turning off the direction indicator lamp or the hazard lamp, each of the first pulse sequences having a pulse number differing from each other, a same pulse width, and a same duty, wherein the pulse number of each of the first pulse sequences is set so that the output of each of the first pulse sequences is finished before stationary vibration of the buzzer is performed, and wherein after the output of the first pulse sequence is finished, the pulse supply device starts the output of next the first pulse sequence before the vibration of the buzzer is stopped.

Furthermore, the pulse supply device outputs the plurality of the first pulse sequences in an order gradually reducing the pulse number.

Furthermore, the pulse supply device supplies the plurality of the first pulse sequences during one of the lighting period and the non-lighting period, and wherein after only one second pulse sequence having a predetermined pulse number is outputted during the other of the lighting period and the non-lighting period, the supply of the pulse is stopped until the other period is finished.

Advantageous Effects of Invention

According to the operation-sound generator of the present invention, the pulse number of each of the first pulse sequences is set so that the output of each of the first pulse sequences is finished before stationary vibration of the buzzer is performed, and after the output of the first pulse sequence is finished, the pulse supply device starts the output of next the first pulse sequence before the vibration of the buzzer is stopped. Thereby, the operation-sound generator of the present invention can extend a state that the stationary vibration of the buzzer is not performed, and can increase sound pressure. Furthermore, the pulse supply device supplies the plurality of the first pulse sequences to the buzzer at intervals during a lighting period of turning on the direction indicator lamp or the hazard lamp or a non-lighting period of turning off the direction indicator lamp or the hazard lamp, each of the first pulse sequences having a pulse number differing from each other, a same pulse width, and a same duty. As a result, in the state that the stationary vibration of the buzzer is not performed, frequency of the pulse is fixed, and the pulse number is changed. Therefore, the operation-sound having a spectrum in wide frequency band as a hit-sound of a mechanical relay can be generated. Thus, the operation-sound similar to the hit-sound of the mechanical relay can be outputted with the sound pressure in which a driver is recognizable.

Furthermore, according to the present invention, the pulse supply device outputs the plurality of the first pulse sequences in an order gradually reducing the pulse number. Thus, the operation-sound further similar to the hit-sound of the mechanical relay can be generated. Furthermore, according to the present invention, the pulse supply device supplies the plurality of the first pulse sequences during one of the lighting period and the non-lighting period, and wherein after only one second pulse sequence having a predetermined pulse number is outputted during the other of the lighting period and the non-lighting period, the supply of the pulse is stopped until the other period is finished. Therefore, difference sounds can be produced with the same frequency during the lighting period and the non-lighting period, and can approach to a modulated relay sound.

DESCRIPTION OF EMBODIMENTS

Figure 1:
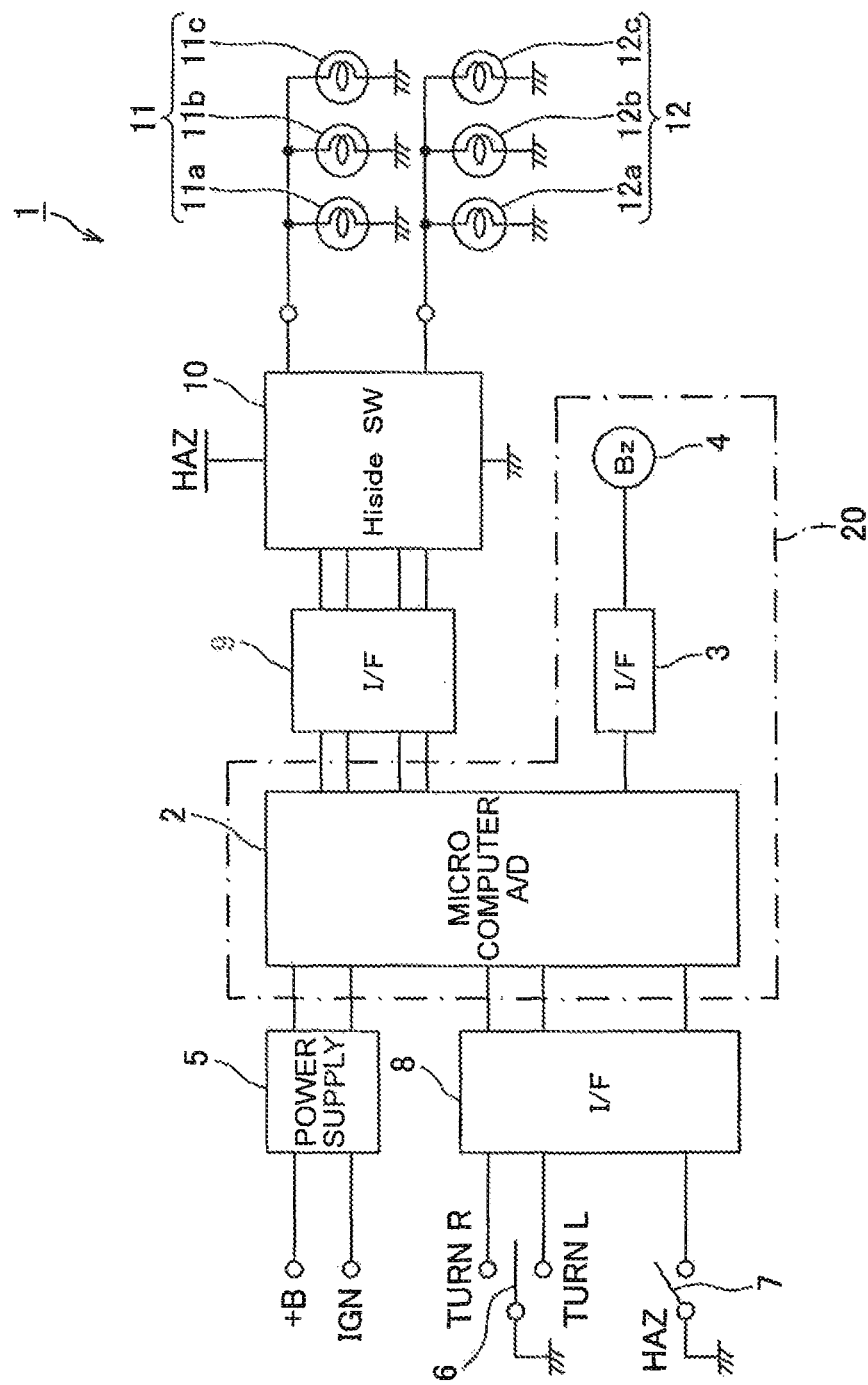
FIG. 1 is a circuit diagram of a direction indicator incorporating an operation-sound generator according to an embodiment of the present invention.

An embodiment of the present invention will be explained with reference to drawings. FIG. 1 is a circuit diagram of a direction indicator 1 incorporating an operation-sound generator according to the embodiment of the present invention.

The direction indicator 1 has a microcomputer 2, I/F (interface) 3, a buzzer 4, a power supply 5, a direction indicator switch 6, a hazard switch 7, I/F (interface) 8, I/F (interface) 9, a HisideSW 10, a right-direction indicator lamp 11, and a left-direction indicator lamp 12.

The microcomputer 2 as a pulse supply device has CPU (Central Processing Unit), a memory, an A/D (analog-digital) converter circuit and so on. When a power source is supplied from the power supply 5, the microcomputer 2 is operated. Furthermore, the microcomputer 2 outputs control signal for blinking the right-direction indicator lamp 11 or the left-direction indicator lamp 12 through the I/F 9 based on the operation of the direction indicator switch 6 or the hazard switch 7 to the HisideSW 10, and outputs a drive pulse to the buzzer 4 through the I/F 3.

The I/F 3 is arranged between the microcomputer 2 and the buzzer 4, and outputs the drive pulse of the buzzer 4 outputted from the microcomputer 2 to the buzzer 4.

The buzzer 4 is constructed with a piezoelectric buzzer, and generates information sound according to the drive pulse inputted from the microcomputer 2 through I/F 3. The buzzer 4 may output warning sound in addition to outputting the operation sound similar to a hit-sound of mechanical relay in synchronization with the blinking of the right-direction and the left-direction indicator lamps 11 and 12.

When an ignition IGN is ON, the power supply 5 converts the power source from a battery +B to a predefined electric voltage, and supplies the converted power source to the microcomputer 2.

The direction indicator switch 6 is constructed with a lever arranged in a steering column of a vehicle, and switches a right direction indicator (TRUN_R) and a left direction indicator (TURN_L) according to a direction in which the vehicle runs. Furthermore, the direction indicator switch 6 outputs a signal according to the right-direction or left-turn to the microcomputer 2 through the I/F 8.

The hazard switch 7 is arranged in an instrument panel of the vehicle. For example, when the hazard switch 7 is operated so as to make an emergency stop, the signal for blinking the right-direction indicator lamp 11 and the left-direction indicator lamp 12 together is outputted to the microcomputer 2 through the I/F 8. At this time, the right-direction indicator lamp 11 and the left-direction indicator lamp 12 function as the hazard lamp.

The I/F 8 outputs the signal outputted from the hazard switch 7 to the microcomputer 2.

The I/F 9 is arranged between the microcomputer 2 and the HisideSW 10, and outputs the control signal for blinking the right-direction indicator lamp 11 or the left-direction indicator lamp 12 outputted from the microcomputer 2 to the HisideSW 10.

The HisideSW 10 converts the control signal inputted from the microcomputer 2 through the I/F 9 to a signal for blinking the right-direction indicator lamp 11 or the left-direction indicator lamp 12, and outputs the converted signal. When the power source HAZ for operating the hazard is supplied, and the hazard switch 7 is operated, both the right-direction indicator lamp 11 and the left-direction indicator lamp 12 are blinked with power supplied from the power source HAZ.

The right-direction indicator lamp 11 has a right-front tamp 11a, a right-side lamp 11b, and a right-rear lamp 11c. The right-front lamp 11a is arranged ahead of the vehicle on the right. The right-side lamp 11b is arranged on the right side of the vehicle. The right-rear lamp 11c is arranged on the right rear of the vehicle. Those lamps 11a, 11b and 11c are blinked when the direction indicator switch 6 is turned to the right, or when the hazard switch 7 is operated.

The left-direction indicator lamp 12 has a left-front lamp 12a, a left-side lamp 12b, and a left-rear lamp 12c. The left-front lamp 12a is arranged ahead of the vehicle on the left. The left-side lamp 12b is arranged on the left side of the vehicle. The left-rear lamp 12c is arranged on the left rear of the vehicle. Those lamps 12a, 12b and 12c are blinked when the direction indicator switch 6 is turned to the left, or when the hazard switch 7 is operated.

In this embodiment of the present invention, an operation-sound generator 20 is composed of the above microcomputer 2, the I/F 3 and the buzzer 4.

Figure 2:
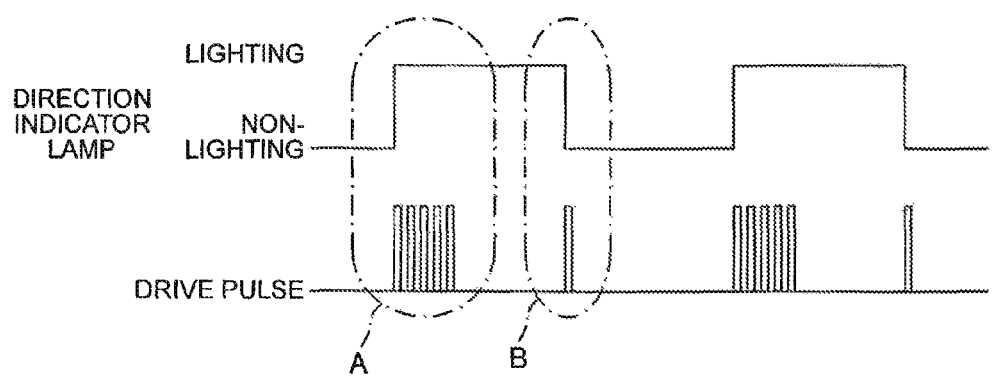
FIG. 2 is a rough timing diagram of a lighting state of right-direction and left-direction indicator lamp lamps constituting the direction indicator shown in FIG. 1 and a drive pulse supplied to a buzzer.
Figure 3:
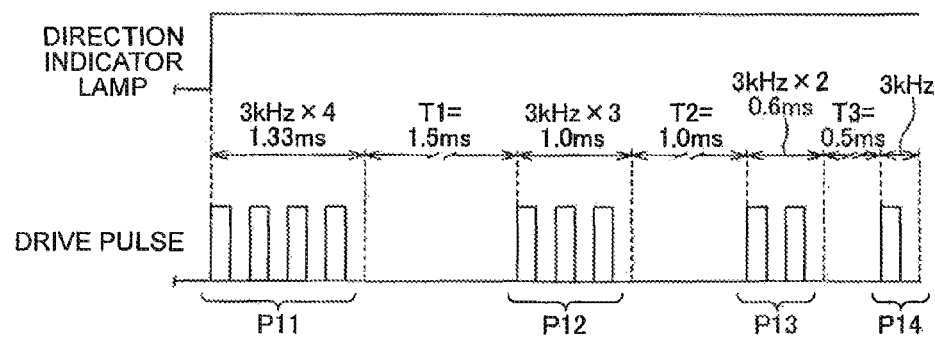
FIG. 3 is an enlarged view of A section of the timing diagram shown in FIG. 2 when a piezoelectric buzzer is used as a buzzer.
Figure 4:
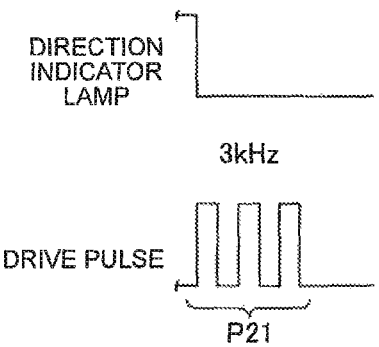
FIG. 4 is an enlarged view of B section of the timing diagram shown in FIG. 2 when the piezoelectric buzzer is used as a buzzer.

Next, in the direction indicator 1 including the above construction, an operation in which the operation-sound generator 20 drives the buzzer according to the blinking operation of the right-direction and left direction indicator lamps 11 and 12 will be explained with reference to FIGS. 2 to 4. FIG. 2 is an outline timing diagram of a lighting state of the right-direction and left-direction indicator lamps arranged in the direction indicator shown in FIG. 1 and the drive pulse supplied to the buzzer. FIG. 3 is an enlarged view of A section of the timing diagram shown in FIG. 2. FIG. 4 is an enlarged view of B section of the timing diagram shown in FIG. 2. In FIG. 2, only five drive pulses are outputted during lighting period of the right-direction and left-direction indicator lamps 11 and 12, however actually the drive pulse is outputted as shown in FIG. 3. Furthermore, one drive pulse is outputted during lights-out period of the right-direction and left-direction indicator lamps 11 and 12 in FIG. 2, however in fact three drive pulses are outputted as shown in FIG. 4.

An operation-sound similar to the mechanical relay synchronized with the blinking of the right-direction and left-direction indicator lamps 11 and 12 as is conventionally done is outputted from the buzzer 4 by the microcomputer 2. More specifically, as shown in FIG. 3, the microcomputer 2 supplies four first pulse sequences P11-P14 which respectively include a pulse number differing from each other to the buzzer 4 at intervals in an order that the pulse number gradually reduces.

The first pulse sequence P11 consists of four pulses, the first pulse sequence P12 consists of three pulses, the first pulse sequence P13 consists of two pulses, and the first pulse sequence P13 P14 consists of one pulse. Those first pulse sequences P11-P14 have the same pulse width, the same duty such as ½, and the same frequency such as 3 kHz each other.

The pulse numbers of those first pulse sequences P11-P14 is set so that the output of each first pulse sequence P11-P14 is finished before stationary vibration of the buzzer 4 is performed. More specifically, when the pulse sequence is outputted to the buzzer 4, at first an oscillator of the buzzer 4 vibrates behind the frequency of the pulse sequence. For this reason, the oscillator vibrates slowly with a frequency lower than the frequency of the pulse sequence, and then the vibration is gradually fast when the output of the pulse sequence continues. Finally, the oscillator of the buzzer 4 vibrates with the frequency of the pulse sequence. The first pulse sequences P11-P14 is set so that the output of the pulse sequence is stopped before arriving at the stationary vibration.

Furthermore, time T1 after outputting the first pulse sequence P11 and before outputting the first pulse sequence P12, time T2 after outputting the first pulse sequence P12 and before outputting the first pulse sequence P13, and time T3 after outputting the first pulse sequence P13 and before outputting the first pulse sequence P14 are set so that after the outputs of the first pulse sequences P11, P12, P13 are completed, the first pulse sequences P12, P13, P14 is outputted before the vibration of the buzzer 4 is stopped. When the pulse number of the pulse sequence is large, time to which the vibration of the buzzer 4 stops is long. For this reason, if the first pulse sequences P11-P14 are outputted in the order reducing the pulse number, the times T1, T2, T3 is set to become progressively shorter. More specifically, the time T1 is set to 1.5 ms, the time T2 is set to 1.0 ms, and the time T3 is set to 0.5 ms.

Thus, during the lighting period of the right-direction indicator and left-direction indicator lamps 11 and 12, as shown in FIG. 3, four pulses are outputted to the buzzer 4. After a lapse of the time T1, three pulses are outputted to the buzzer 4. Later, after a lapse of the time T2, two pulses are outputted to the buzzer 4, and then after a lapse of the time T1 one pulse is outputted thereto.

The outputs of the first pulse sequences P11-P14 are completed, the output of the pulse sequence for the buzzer 4 is stopped by the microcomputer 2 until the lighting period is finished. In the same manner as the first pulse sequences, the pulse number of the second pulse sequence P21 is set so that the output of the second pulse sequence P21 is finished before steady state vibration of the buzzer 4 is performed.

The frequency, the duty, the pulse number, and the time T1-T3 in the first pulse sequences P11-P14, and the frequency, the duty and the pulse number in the second pulse sequence P21 are stored in an EEPROM not shown. Furthermore, the microcomputer 2 refers to each value of the EEPROM, and outputs the drive pulse to the buzzer 4.

According to the direction indicator 1, the pulse numbers of a plurality of the first pulse sequences P11-P14 are set so that the outputs of the first pulse sequences P11-P14 is completed before the buzzer 4 vibrates steady. After the outputs of the first pulse sequences P11, P12 and P13 are respectively finished, the microcomputer 2 stars the outputs of the next first pulse sequences P12, P13 and P14 before the vibration of the buzzer 4 is stopped. Thereby, when the first pulse sequence P11 is inputted, the oscillator of the buzzer 4 vibrates, and then the vibration is gradually fast. Thereafter, the output of the first pulse sequence P1 is finished before arriving at the stationary vibration, and the vibration of the buzzer 4 becomes slow. Before the vibration of the buzzer 4 is stopped, the second pulse sequence p12 is outputted and the vibration of the buzzer 4 becomes again fast. However, the output of the second pulse sequence P12 is finished before arriving at the stationary vibration. After that, it is repeated.

In other words, a state in which the buzzer 4 does not vibrate with steady-state can be extended, and sound pressure can be increased. Furthermore, the microcomputer 2 supplies a plurality of the first pulse sequences P11-P14 respectively constructed with the pulse number differing from each other and including the same pulse width, the same duty to the buzzer 4 at intervals during the period turning on the right-direction indicator and left-direction indicator lamps 11 and 12. When the buzzer 4 does not vibrate with the steady-state, the vibration frequency of the buzzer 4 depends on the pulse number. Therefore, when the buzzer 4 does not vibrate with the steady-state, the operation-sound similar to the hit-sound of the mechanical relay and having the spectrum in wide frequency band can be produced by fixing the frequency of the pulse and changing the pulse number. Thus, the operation-sound generator 20 of the present invention can output the operation-sound similar to the hit-sound of the mechanical relay with sound pressure enabling the driver to recognize it.

Furthermore, according to the above direction indicator 1, the microcomputer 2 outputs a plurality of the first pulse sequences P11-P14 in the order that the pulse number gradually reduces. As a result, the operation-sound further similar to the hit-sound of the mechanical relay can be produced.

Furthermore, according to the above direction indicator 1, the microcomputer 2 supplies the first pulse sequences P11-P14 during the lighting period, and outputs only the second pulse sequence P21 during the non-lighting period. Thereafter, the microcomputer 2 make the supply of the pulse to stop until the non-lighting period is finished. Therefore, difference sounds can be produced with the same frequency during the fighting period and the non-lighting period, and can approach to a modulated relay sound.

Figure 5:
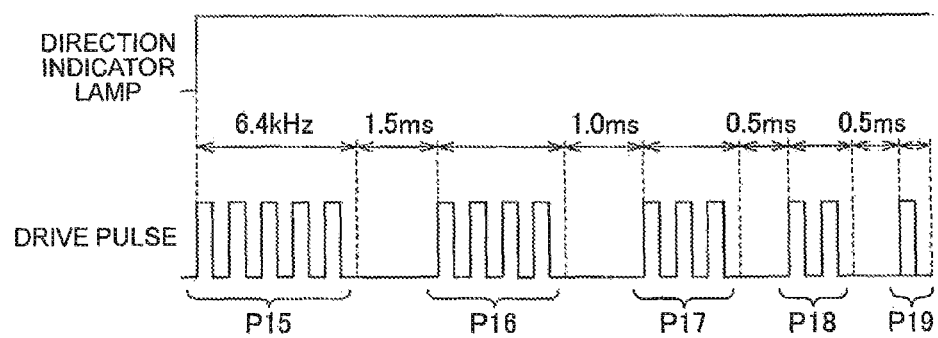
FIG. 5 is an enlarged view of A section of the timing diagram shown in FIG. 2 when a electromagnetic buzzer is used as a buzzer.
Figure 6:
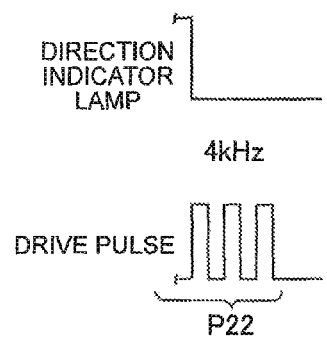
FIG. 6 is an enlarged view of B section of the timing diagram shown in FIG. 2 when the electromagnetic buzzer is used as a buzzer.
Figure 7:
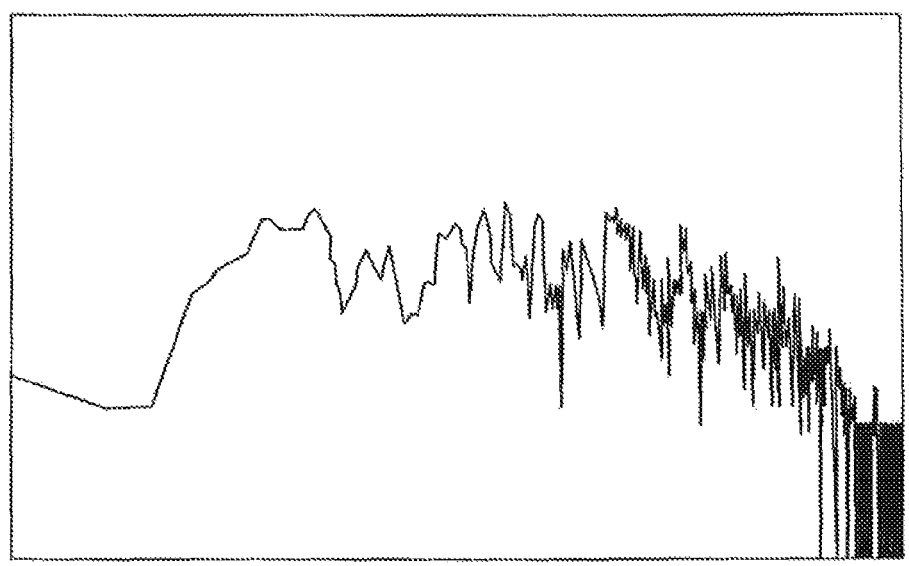
FIG. 7 is a graph showing frequency component of a hit-sound of a mechanical relay.
Figure 8:
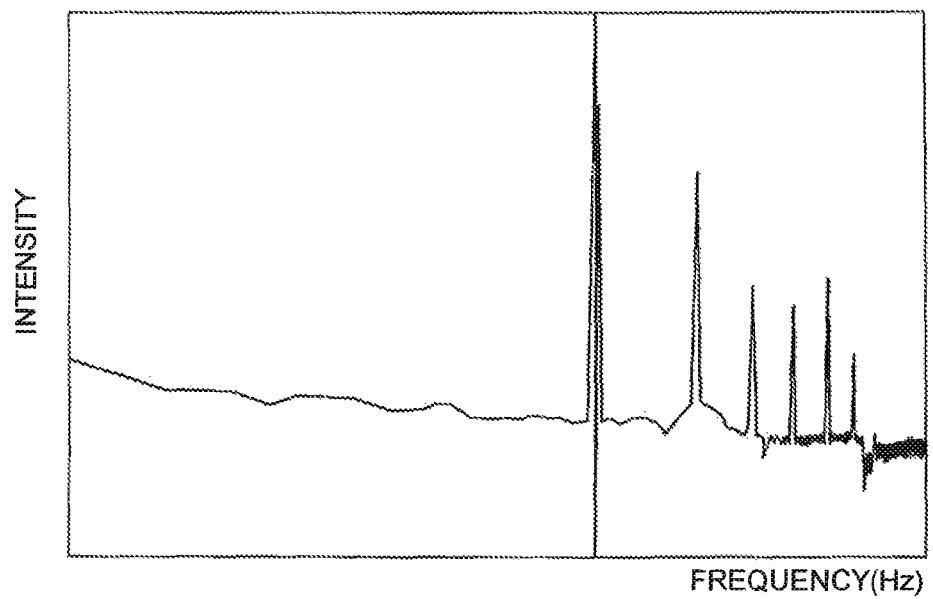
FIG. 8 is a graph showing frequency component in a state generally sounding with a buzzer.
Figure 9:
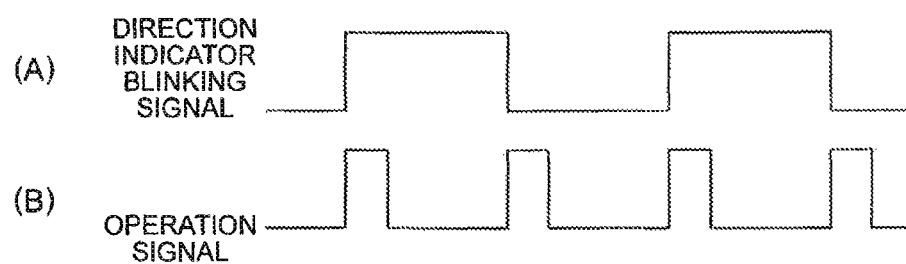
FIG. 9 is a timing diagram of signal outputted from a conventional generator for indicating a direction. A direction indicator blinking signal is shown in (A), an operation signal in (B).

FIGS. 3 and 4 show the drive pulse when the piezoelectric buzzer is used as the buzzer 4. For example, when an electromagnetic buzzer is used as the buzzer 4, the first pulse sequences P15-P19 and the second pulse sequence P22 are outputted as shown in FIGS. 5 and 6, respectively. The first pulse sequences P15, P16, P17. P18, and P19 have the same frequency such as 6.4 kHz, the same duty such as ½), and are composed of the pulses of five, four, three, two, and one, respectively. The second pulse sequence P22 consists of three pulses including the frequency of 4 kHz, and the duty of ½. In this manner, frequency characteristic varies according to the type of the buzzer 4. For this reason, each pulse sequence may constructed with the frequency, the duty, and the pulse number so that optimism sound can be produced with each vehicle. Furthermore, since information of the first pulse sequence and the second pulse is stored in the EEPROM, and the microcomputer 2 outputs the first and second pulse sequences according to the information, it is possible to change the buzzer 4.

In addition, according to the above embodiment, the first pulse sequences P11-P14 are outputted during the lighting period of the right-direction and left-direction indicator lamps 11 and 12, and the second pulse sequence P21 is outputted during the non-lighting period, however the present invention is not limited thereto. For example, the first pulse sequences P11-P14 may be outputted during the non-lighting period of the right-direction and left-direction indicator lamps 11 and 12, and the second pulse sequence P21 may be outputted during the lighting period. Furthermore, during both the lighting and the non-lighting periods, the first pulse sequences P11-P14 may be outputted.

Moreover, according to the above embodiment, the first pulse sequences P11-P14 are outputted in the order that the pulse number gradually reduces, however the preset invention is not limited thereto. For example, the pulse number may be three, two, one, four in that order.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

REFERENCE SIGNS LIST

2 microcomputer (pulse supply device)
4 buzzer
11 right-direction indicator lamp (direction indicator lamp)
12 left-direction indicator lamp (direction indicator lamp)
20 operation-sound generator

The invention claimed is:

1. An operation-sound generator having a buzzer outputting an operation-sound synchronized with a blinking of a direction indicator lamp or a hazard lamp comprising:
a pulse supply device supplying a first pulse group to the buzzer during a lighting period of turning on the direction indicator lamp or the hazard lamp or during a non-lighting period of turning off the direction indicator lamp or the hazard lamp, and not supplying the first pulse group to the buzzer during a subsequent period, the first pulse group including a first pulse sequence plurally at rest intervals with no pulse, each first pulse sequence including one or more pulses, all pulses of the first pulse group having a same pulse width and a same duty, a number of pulses of each first pulse sequence, differing from each other, wherein the first pulse group is once outputted within a single period of the lighting period or the non-lighting period, wherein there are at least three pulse sequences of the first pulse group having three different numbers of pulses, wherein the number of pulses of each first pulse sequence is set so that the output of each first pulse sequence is finished before steady-state vibration of the buzzer in which the buzzer vibrates with a frequency of the pulse sequences is performed, and wherein after the output of the first pulse sequence is finished, the pulse supply device starts the output of the next first pulse sequence before the buzzer stops vibrating.

2. The operation-sound generator as claimed in claim 1, wherein the pulse supply device outputs the first pulse group in an order gradually reducing the number of pulses.

3. The operation-sound generator as claimed in claim 1, wherein the pulse supply device supplies the first pulse group either during the lighting period, and wherein after only one second pulse sequence having a predetermined pulse number is outputted during the non-lighting period, the supply of the pulse stops until the non-lighting period is finished, or during the non-lighting period, and wherein after only one second pulse sequence having a predetermined pulse number is outputted during the lighting period, the supply of the pulse is stopped until the lighting period is finished.

4. The operation-sound generator as claimed in claim 2, wherein the pulse supply device supplies the first pulse group either during the lighting period, and wherein after only one second pulse sequence having a predetermined pulse number is outputted during the non-lighting period, the supply of the pulse stops until the non-lighting period is finished, or during the non-lighting period, and wherein after only one second pulse sequence having a predetermined pulse number is outputted during the lighting period, the supply of the pulse is stopped until the lighting period is finished.

* * * * *